May 31, 1960 E. W. SIMONS 2,938,691
ADJUSTABLE MOUNTING MEANS FOR MIRRORS AND SIMILAR BODIES
Filed April 10, 1957 2 Sheets-Sheet 1
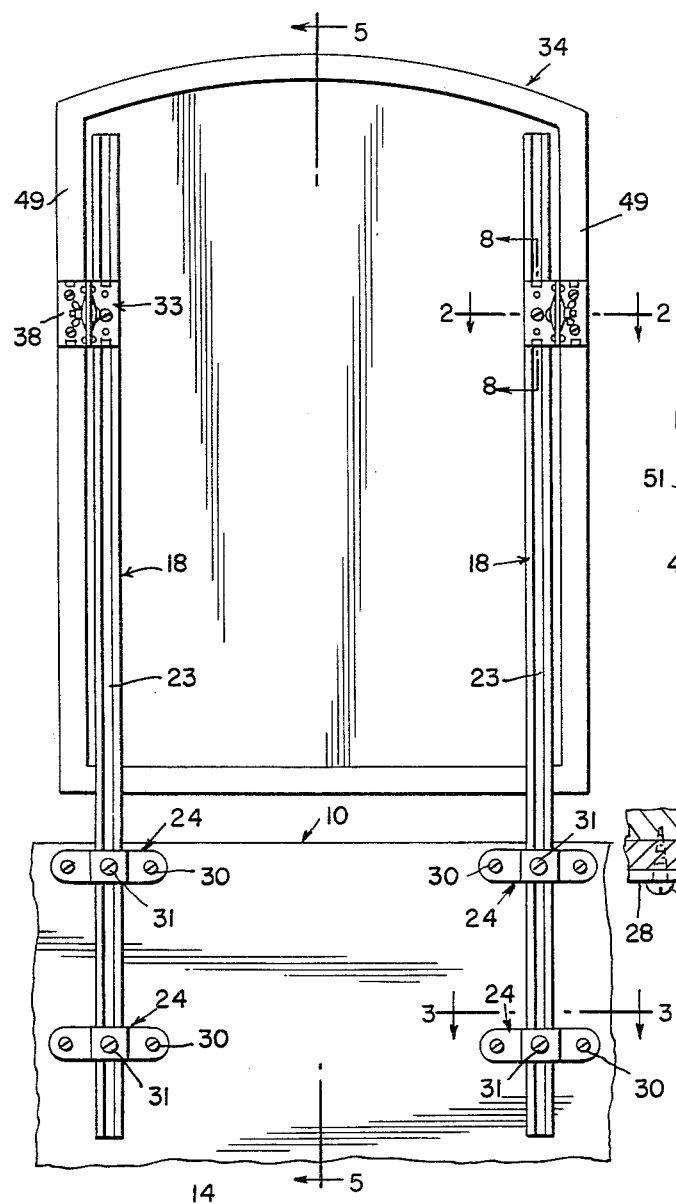
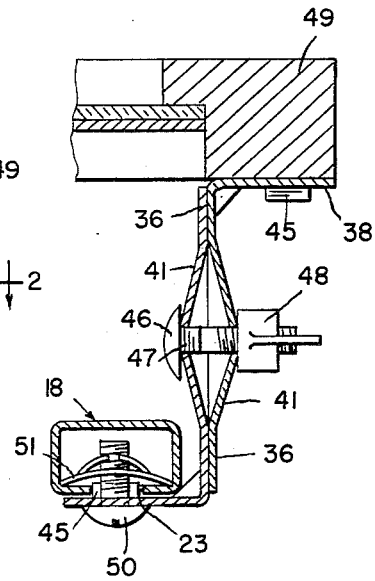
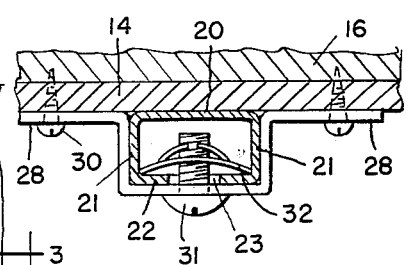
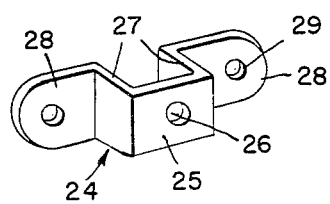
Inventor
Elizabeth W. Simons
By Shoemaker & Mattare
ATTYS May 31, 1960 E. W. SIMONS 2,938,691
ADJUSTABLE MOUNTING MEANS FOR MIRRORS AND SIMILAR BODIES
Filed April 10, 1957 2 Sheets-Sheet 2
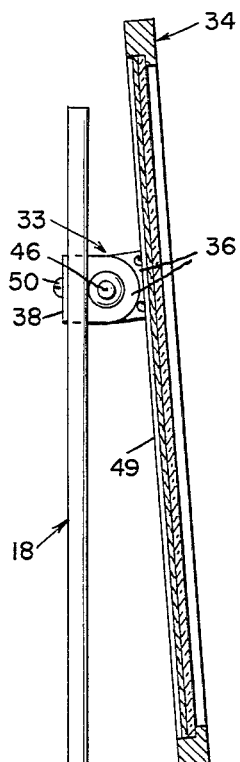
FIG.5
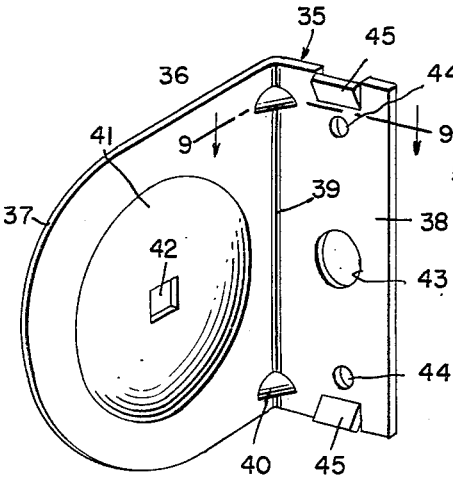
FIG.7
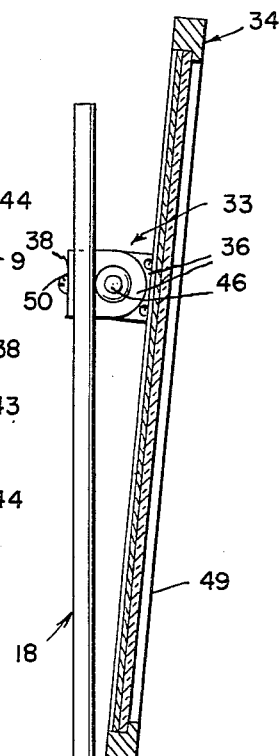
FIG.6
FIG.8
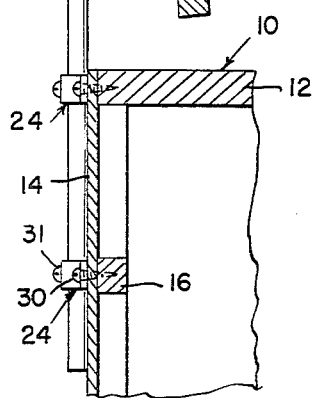
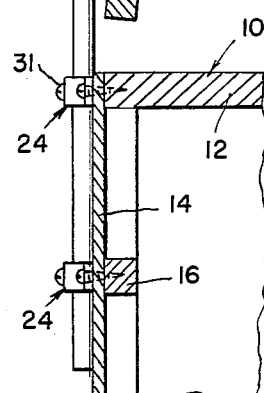
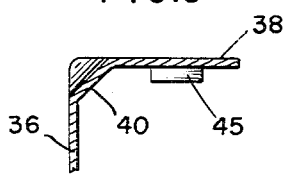
FIG.9
Inventor
Elizabeth W. Simons
By Shoemaker & Mattare
ATTYS

United States Patent Office 2,938,691
Patented May 31, 1960

2,938,691

ADJUSTABLE MOUNTING MEANS FOR MIRRORS AND SIMILAR BODIES

Elizabeth W. Simons, 3306 Rowan Road, Sedgefield, Greensboro, N.C.

Filed Apr. 10, 1957, Ser. No. 652,002

3 Claims. (Cl. 248—28)

This invention relates generally to the class of supports and is directed particularly to an improved adjustable mounting means for mirrors or similar bodies.

In mounting mirrors upon dressing tables and similar articles of furniture, it is desirable that such mounting be of a nature to permit the mirror to be adjusted, both vertically and by tilting, so that it can be positioned in the best or most convenient location for use. Various types of mounting means have been devised which generally permit such adjustments but they ordinarily are of a more or less complicated nature and are made up of a multiplicity of parts which makes their production on an economical basis difficult.

It is, in view of the foregoing, a particular object of the present invention to provide a new adjustable means for mounting mirrors or similarly formed bodies, which is of a relatively simple design and wherein a minimum number of parts are required and which parts are so designed that they can be produced on a quantity basis at a minimum cost.

Another object of the invention is to provide a new and improved adjustable mounting means for mirrors and the like, by means of which the mirror or other body will be firmly supported and at the same time can be easily and quickly adjusted both vertically and by forward and rearward tilting to a desired position of use.

Still another object of the invention is to provide a mounting means of the character stated which will support a heavy body such as a mirror in such a manner that it cannot turn or twist from its set position.

A still further and more specific object of the invention is to provide an adjustable mounting means for mirrors and bodies of similar shape or form, wherein parts functioning as hinges are designed in a unique manner to be readily interchangeable one with another and, therefore, may be produced on a quantity basis by stamping and punching operations so that the mounting may be economically produced.

The invention will be best understood from a consideration of the following detail description taken in connection with the accompanying drawing forming part of the specification, with the understanding, however, that the invention is not confined to a strict conformity with the showing of the drawing but may be changed or modified so long as such changes or modifications mark no material departure from the salient features of the invention as expressed in the appended claims.

In the drawings:

Fig. 1 is a view of the rear of a mirror and a portion of an underlying supporting body such as a dresser or the like, and showing the adjustable mounting means of the present invention supporting the mirror in upright position;

Fig. 2 is a detail section on an enlarged scale taken substantially on the line 2—2 of Fig. 1;

Fig. 3 is a transverse section on an enlarged scale taken substantially on the line 3—3 of Fig. 1;

Fig. 4 is a view in perspective of one of the mounting brackets for a standard;

Fig. 5 is a vertical section taken substantially on the line 5—5 of Fig. 1 illustrating the manner in which the supported mirror may be disposed at a rearward inclination;

Fig. 6 is a sectional view corresponding to Fig. 5 but showing the manner in which the mirror may be disposed at a forward inclination;

Fig. 7 is a view in perspective of one of the two units which cooperate to form a hinge mount;

Fig. 8 is a sectional view on an enlarged scale taken substantially on the line 8—8 of Fig. 1; and Fig. 9 is a detail section through the corner of a unit of the hinge mount, the section being approximately on the line 9—9 of Fig. 7.

Referring now more particularly to the drawings, the numeral 10 generally designates a base structure upon which may be mounted by means of the present invention, a mirror or other body of similar character which it may be desirable to maintain in a vertical position or in an inclined position. The part 10 defined as a base may be a bureau, a dressing table or like structure, having a top 12 and the back 14 across the inner side of which is disposed a reinforcing strip or rail 16.

In accordance with the present invention there are provided two standards each of which is generally designated 18 and which are in the form of channel bars of substantially rectangular cross section as shown in Fig. 3, having the back portion 20 and the side flanges 21. These side flanges 21 have inturned or inwardly directed narrow facing flanges 22, the longitudinal edges of which are in spaced relation to form the longitudinal slot 23.

In mounting the standards 18 on the back of the supporting base 10, the standards are disposed in the desired horizontally spaced relation with the back portion 20 of the channel against the panel 14 and extending downwardly a substantial distance to cross the reinforcing rail 16 and each of the standards is secured in upright position with the major portion of its length extending above the top 12 of the base structure by a U-shaped mounting bracket such as is shown in perspective in Fig. 4 and generally designated 24. This mounting bracket is of conventional form or design and is approximately rectangular to fit across the standard and has the front or forward side 25 provided with a bolt opening 26 which aligns with the slot 23. The sides 27 of the bracket extend across the adjacent sides 21 of the standard over which the bracket is placed and these sides 27 terminate in the oppositely directed ears 28 which are apertured as indicated at 29 to receive securing elements such as screws 30 or the like.

As shown in Figs. 1, 5 and 6, each standard may be secured in place by two of the mounting brackets 24, one of which is located in a position to have the securing screws passed through the back panel 14 of the base structure into the reinforcing rail 16 while the upper brackets are positioned to have the securing screws passed into the back edge of the top 12.

As previously stated, the openings 26 of the mounting brackets are provided to receive a bolt such as is shown on an enlarged scale in Fig. 3 and designated 31, and positioned within the channeled standard to extend across the slot 23 is a self-locking nut which is generally designated 32, with which the threaded end of the bolt is engaged.

This self-locking nut may be of any desired type but is here shown as being of the type which is known as a Tinnerman nut, which when threaded up tightly on the bolt, applies frictional pressure to the bolt threads and thus prevents accidental unthreading of the bolt.

The mounting of the standards in the manner illustrated provides for ready vertical adjustment of the same, as will be readily apparent, by merely loosening the bolts 31 to permit the standards to be slipped up or down in their holding brackets 24.

Carried upon each of the standards 18 at the desired elevation above the top 12 of the supporting base is a novel hinge mount which is generally designated 33 and by means of which a mirror such as that generally designated 34, or any other body of a similar nature or form, can be supported in a desired position of use.

Each of the hinge mounts 33 is made up of two duplicate or identical units, one of which is shown in perspective in Fig. 7 and is generally designated 35. These units being duplicates, are readily interchangeable between the mirror and a standard so that they may be easily and quickly coupled together in pairs and attached to the mirror and standard.

The unit 35 constituting one of the pair making up the hinge mount comprises a friction and hinge plate 36 having a substantially semi-circular end edge 37 while at the opposite end from the edge 37 there is formed the right angularly extending leaf 38.

The leaf 38 is of substantially greater length than width as shown, the width of the leaf being approximately the same as the width of a standard 18 although this proportion is not essential.

The unit 35 is formed from one piece of metal of suitable weight and may be formed by a stamping operation as will be readily apparent, and in such operation a portion of the metal across the angle 39 formed by the plate 36 and leaf 38, is pressed in toward the inner side of the angle to form across the angle or across the corner a stiffening web 40. This stiffening web rigidifies the unit structure so that use may be made of a plate material of lighter weight than would be possible if such stiffening were not provided.

The hinge and friction plate 36 of the unit 35 is pressed to have the circular dished portion 41, the convex side of which lies nearest to the leaf 38. In other words, the dished formation extends toward the inner side of the angle formed by the plate and the leaf.

At the center of the dished portion 41 of the plates there is formed a bolt opening 42 of polygonal outline, the opening here shown being square to receive the square shank portion of a carriage bolt.

Midway between the ends of the leaf 38 there is formed a relatively large opening 43 for the reception of a locking bolt, as hereinafter described.

Adjacent to each end of the leaf 38 and on approximately the longitudinal center thereof is a smaller opening 44 for the reception of securing elements such as screws or the like, by which the leaf is attached or secured to the back of the mirror or like body, in the manner hereinafter described.

Each end edge of the leaf 38 has a short positioning tongue 45 struck inwardly therefrom, that is, the tongues are struck out to project beyond that side face of the leaf 38 which is nearest to the convex side of the dished portion 41 of the plate 36.

The positioning tongue is of a width to fit without binding in the slot 23 of a standard 18 and when a pair of units 35 are placed in assembled relation for use, one leaf will be disposed against the rear side of a standard with the tongues 45 engaging in the slot 23 while the other leaf of the pair will be disposed against the rear side of the mirror frame to be attached thereto by securing elements.

In assembling the units 35 of the hinge mount the dished plates are placed together with the concave sides opposing and there is then extended through the aligned openings 42 a bolt 46 of the type known as a carriage bolt, which has a portion of the shank at the underside of the head squared as indicated at 47 and which squared portion engages in the squared opening 42 adjacent to the head. The bolt is of sufficient length to extend through the dished plates and a substantial distance beyond the one thereof remote from the bolt head to receive a wing nut or thumb nut 48.

In the use of the hinge mounts and standards for the support of a mirror, for example, which embodies a frame having vertical side bars 49, one hinge mount will be secured to each of the side bars 49 of the mirror frame in the manner shown in Fig. 1. When the two units of a hinge mount are joined together in the manner stated, it will be apparent upon reference to Fig. 2 particularly, that the leaves 38 of the two units project in opposite directions so that when the leaf 38 of a unit of one mount is secured to the back of a side bar 49 of the frame by means of securing screws passed through the screw holes 44, the opposing friction and hinge plates 36 will be inset from the outer side of the frame member 49 and the other leaf 38 will be still further set in from the adjacent outer side of the mirror frame.

It will be understood from the foregoing that the standards 18 will, therefore, be initially set in position and secured to tht rear of the base 10 so that the spacing between them will match the spacing between the innermost leaves 38 of the two oppositely positioned hinge mounts and these leaves will then be disposed against the back faces of the standards against the flanges 22 thereof, with the positioning tongues 45 in the slots of the standards, as hereinbefore described. There are then extended through the openings 43 of the leaves 38 which are disposed across the slots of the standards, the securing bolts 50 which are of the same character as the bolts 31 hereinbefore described, and which thread through self-locking nuts 51 of the type hereinbefore referred to, located within the channel of the standard.

When the mirror or other body which is carried on the adjustable mounting means has been set in position in the manner described, it being understood, of course, that the bolts 46 of the two mounts are in alignment transversely of the body, the body can be fixed in the desired position by tightening the thumb nuts 48. When the thumb nuts are thus tightened it will be seen that compression is applied to the opposing dished portions 41 of the two units of each hinge mount so that the relatively tight frictional engagement will be maintained between the contacting faces of the plates 36 around the dished portions 41. By regulating the degree of tightness between the plates the mirror or other body can be swung or tilted on the axes of the aligned bolts 46 and will maintain the tilted position to which it is moved.

The mirror or other body will be firmly supported, either perfectly vertically or in rearwardly inclined or forwardly inclined position, as illustrated respectively in Figs. 5 and 6.

In addition to providing the means for holding the mirror vertical or in tilted position as described, it will be apparent also that vertical adjustment can be easily and quickly made by loosening the screws 50 to permit the self-locking nuts 51 to slide in the channels of the standards. There are thus provided two ways of adjusting the vertical position of the mirror, either by means of the bolts or screws 31 and nuts 32 or by means of the bolts and nuts 50—51 which are connected with the hinge mounts.

It will be apparent from the foregoing that the adjustable mounting means here illustrated and described may be very economically produced because of the fact that the units making up the hinge mounts are identical in all respects and can be readily formed by stamping and punching operations and can be easily and quickly assembled since no particular orientation is required in placing two units together for use. The leaf 38 of either unit of a mount can be applied to and fixed in position on a standard or applied to and fixed in position on the back of the mirror frame. After attaching the hinge mount to a side of the mirror frame and fixing the leaf of the appropriate unit to a standard in the manner described, it will be seen that although only a single bolt is employed for securing the leaf to the standard, the leaf will not turn because of the engagement of the positioning tongues 45 in the slot of the standard.

It will also be readily apparent that the mounting means of the present invention when put into use will be completely hidden from the view of a person standing in front of the mirror, except for a very small part of each of the standards 18 and, of course, the vertical adjustment of the mirror may be such as to bring the bottom part into very close proximity to the top 12 of the supporting base so that very little of the standard need be on view from the front of the structure.

I claim:

1. A mounting means for a body such as a mirror or the like comprising a pair of standards of channel form and having a back and a front side, the front side having a slot leading into the channel, the standards being mounted on a support for use in upright, spaced, parallel relation with the slots facing in the same direction and away from the support, a hinge mount for each standard, each mount comprising a pair of plates in side by side engaged relation, a pivot bolt coupling the engaged plates for relative turning, a leaf integral with each plate and projecting from one side face at an angle thereto, one plate of each pair being disposed across a side of a standard with the leaf of the plate lying across the slot of the standard, the leaf of the other plate of each pair being at the side of the pivot remote from the slotted side of the standard, securing means carried by each leaf which lies across a standard slot for engagement in the standard channel through the slot for securing the mount in position on the standard, means facilitating attachment of the leaf of the said other plate of each pair to the body to be supported and other means carried by each of the leaves which lies across a standard slot and engaging in the slot to maintain the leaves against turning on the securing means.

2. The invention according to claim 1, wherein the said other means comprises a tongue projecting from the side of the leaf and having sliding engagement in the slot.

3. The invention according to claim 1, wherein the pair of plates and the leaves thereof are of duplicate form and each leaf has the said other means at opposite end edges thereof in the form of a guide tongue projecting from that face of the leaf which is nearest to the joining plate and each leaf also having in a line between the tongues an opening for receiving the said securing means and each plate also having other openings forming the said means for facilitating attachment of the leaf to the body to be supported.

References Cited in the file of this patent

UNITED STATES PATENTS

| | | |
|---|---|---|
| 829,070 | Hansen | Aug. 21, 1906 |
| 1,504,523 | Sherer | Aug. 12, 1924 |
| 2,177,294 | Soss | Oct. 24, 1939 |
| 2,598,531 | Garrett | May 27, 1952 |
| 2,737,268 | Smith | Mar. 6, 1956 |